Figure 1:
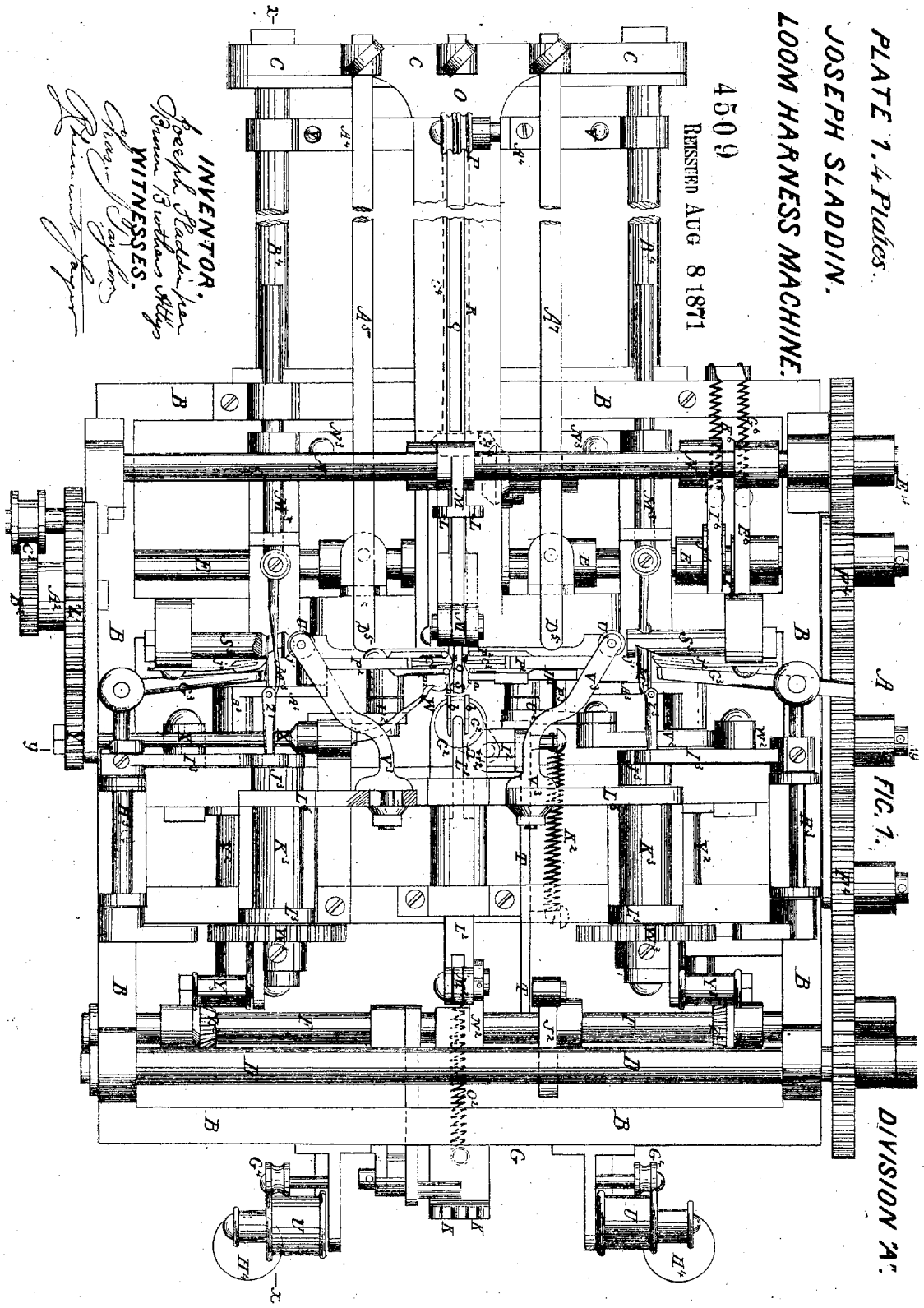

PLATE 1. 4 Plates.

JOSEPH SLADDIN.

LOOM HARNESS MACHINE.

4509

REISSUED AUG 8 1871

DIVISION "A".

INVENTOR.

Joseph Sladdin per Brown Brothers Attys

WITNESSES.

Chas. J. Taylor

Clement Sayer

AM. PHOTO-LITHOGRAPHIC CO. N.Y. (OSBORNE'S PROCESS.)

PLATE 2. 4 Plates

JOSEPH SLADDIN. LOOM HARNESS MACHINE.

4509

DIVISION "A".

INVENTOR.

Joseph Sladdin per Brown Brothers Attys

WITNESSES.

Chas. J. Taylor

Rheinhart Jager

AM. PHOTO-LITHOGRAPHIC CO. N.Y. (OSBORNE'S PROCESS.)

PLATE. 3. 4 Plates.

JOSEPH SLADDIN. LOOM HARNESS MACHINE. DIVISION "A".

4509

INVENTOR.

Joseph Sladdin
for
Burns Brothers
Attys

WITNESSES.

Chas. Taylor

Clement Jaeger

AM. PHOTO-LITHOGRAPHIC CO. N.Y. (OSBORNE'S PROCESS.)

PLATE 4. 4 Plates. 4509

DIVISION "A".

JOSEPH SLADDIN. LOOM HARNESS MACHINE.

WITNESSES.

Geo. Hayes

Henry Hayes

INVENTOR.

Joseph Sladdin per Henry Bastian Atty

AM. PHOTO-LITHOGRAPHIC CO. N.Y. (OSBORNE'S PROCESS.)

UNITED STATES PATENT OFFICE.

JOSEPH SLADDIN, OF LAWRENCE, MASSACHUSETTS.

IMPROVEMENT IN MACHINES FOR MAKING LOOM-HARNESS.

Specification forming part of Letters Patent No. 80,774, dated August 4, 1868; reissue No 4,509, dated August 8, 1871.

DIVISION A.

*To all whom it may concern:*

Be it known that I, JOSEPH SLADDIN, of Lawrence, in the county of Essex and State of Massachusetts, have invented a certain new and useful Improvement in Machine for Making Harness for Looms, of which the following is a full, clear, and exact description, reference being had to the accompanying drawing forming part of this specification.

This invention relates to improvements in machinery arranged for the manufacture of that class of loom-harness made from continuous yarns, from one of which the heddle-eyes or nooses are successively made with the other yarn looped around one end of each and every heddle-eye in turn, and both yarns secured to the rig-bands, completing the harness. The invention consists: First, of a stationary needle for use in such machine, constructed with a groove along its upper face or side, and with two eyes leading from said groove, one through each side of the needle, through which eyes the two continuous yarns are passed for being woven or made into loom-harness. Second, of a twister of peculiar construction for seizing one of the yarns employed and carrying the same about a former of suitable shape for forming said yarn into a heddle-eye. Third, of a peculiarly-constructed device for pushing the heddle-eye produced upon a former to and from the former onto a stationary needle delivering two yarns, and to a plane beyond that of the eyes of said needle. Fourth, of the combination of the needle, heddle-eye, former, and pusher before referred to, arranged and operated in regard to each other to produce from continuous yarns delivered by the needle a heddle-eye, and to deposit it upon the said needle beyond its eyes, drawing the yarn issuing from said eyes along with it. Fifth, in the combination with the needle before described, delivering two yarns from which to make a harness, of the devices arranged as hereinafter described, at each side of the needle, to act simultaneously and with a movement suitable to seize the yarns issuing from each side of the needle, and to carry the same outward to the rig-bands, whereon, by knitting, they are secured, said yarn-carrying devices being returned to position to again seize and take the yarns, and so on. Sixth, of a fork-shaped lever, arranged to hold by its tines the noose or heddle-eye deposited on the needle, while yarns are carried to the rig-bands for being secured to them, said lever having a link-connection which insures the true vertical movement of the tines. Seventh, in machines for making loom-harness from continuous yarns, of rods located within the machine so as to extend through the harness parallel or nearly so with its line of travel in the machine, such rods being operated, as hereinafter described, to produce what is known as the leese of the harness.

Figure 2:
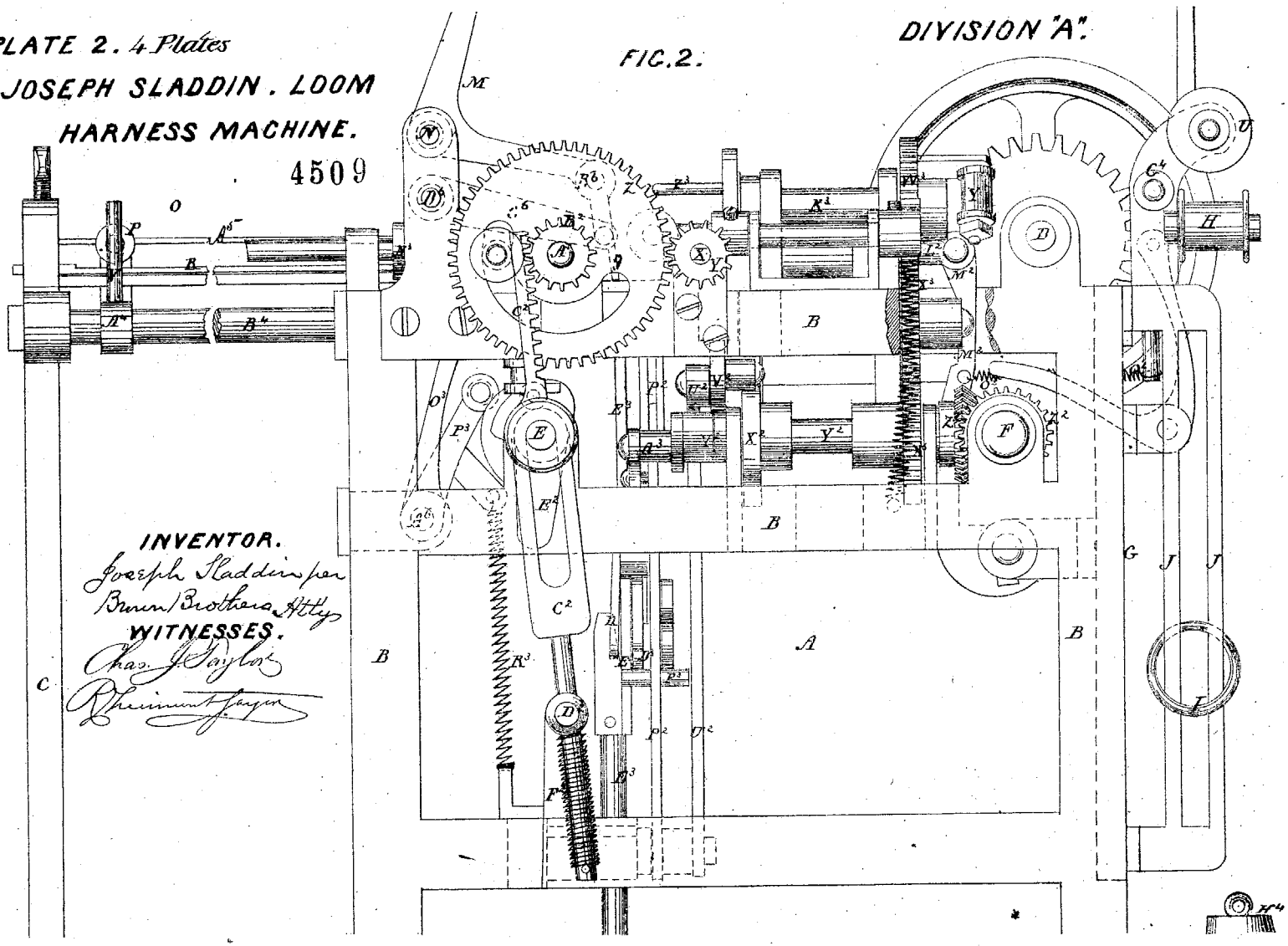
Figure 3:
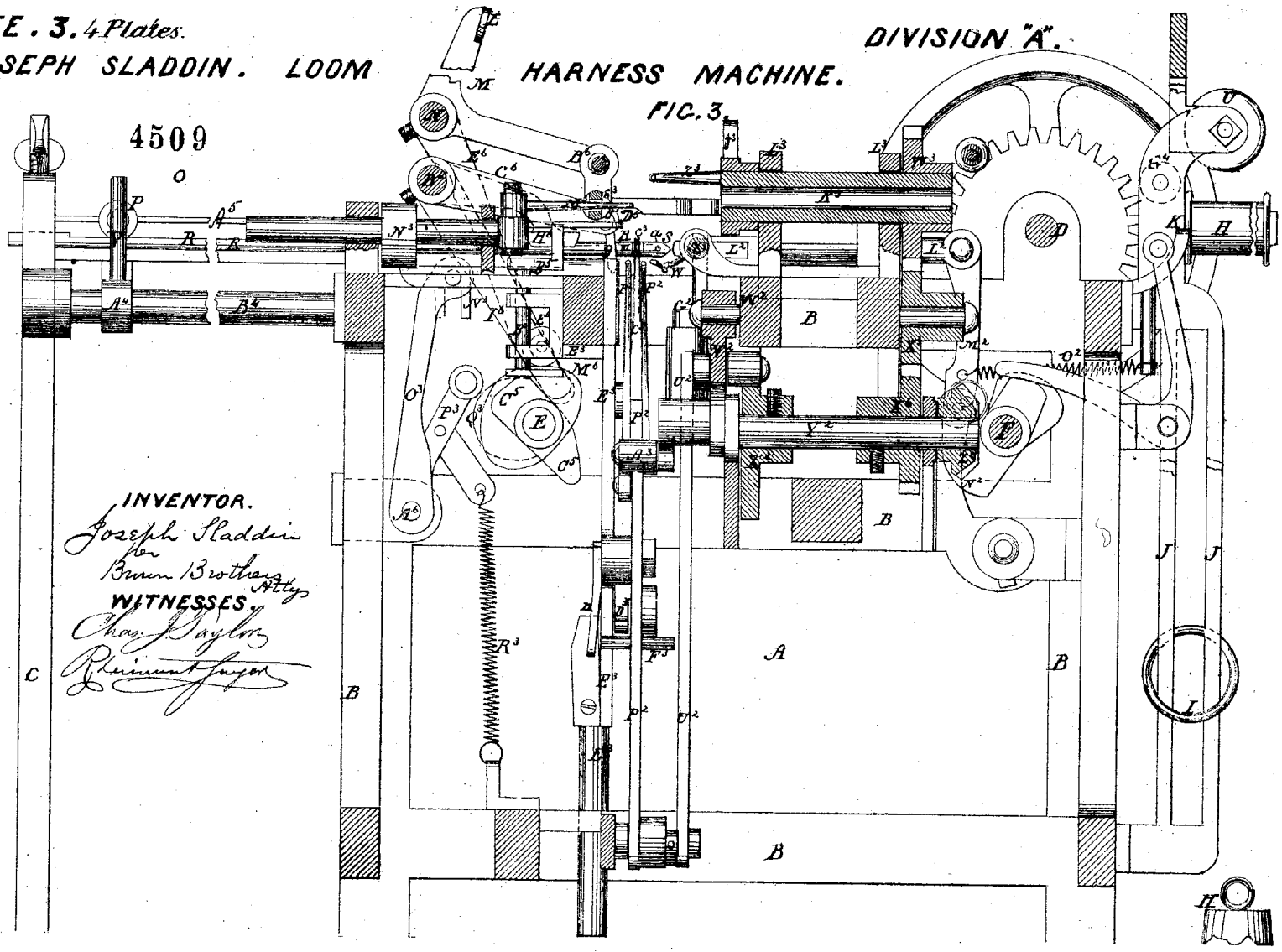
Figure 4:
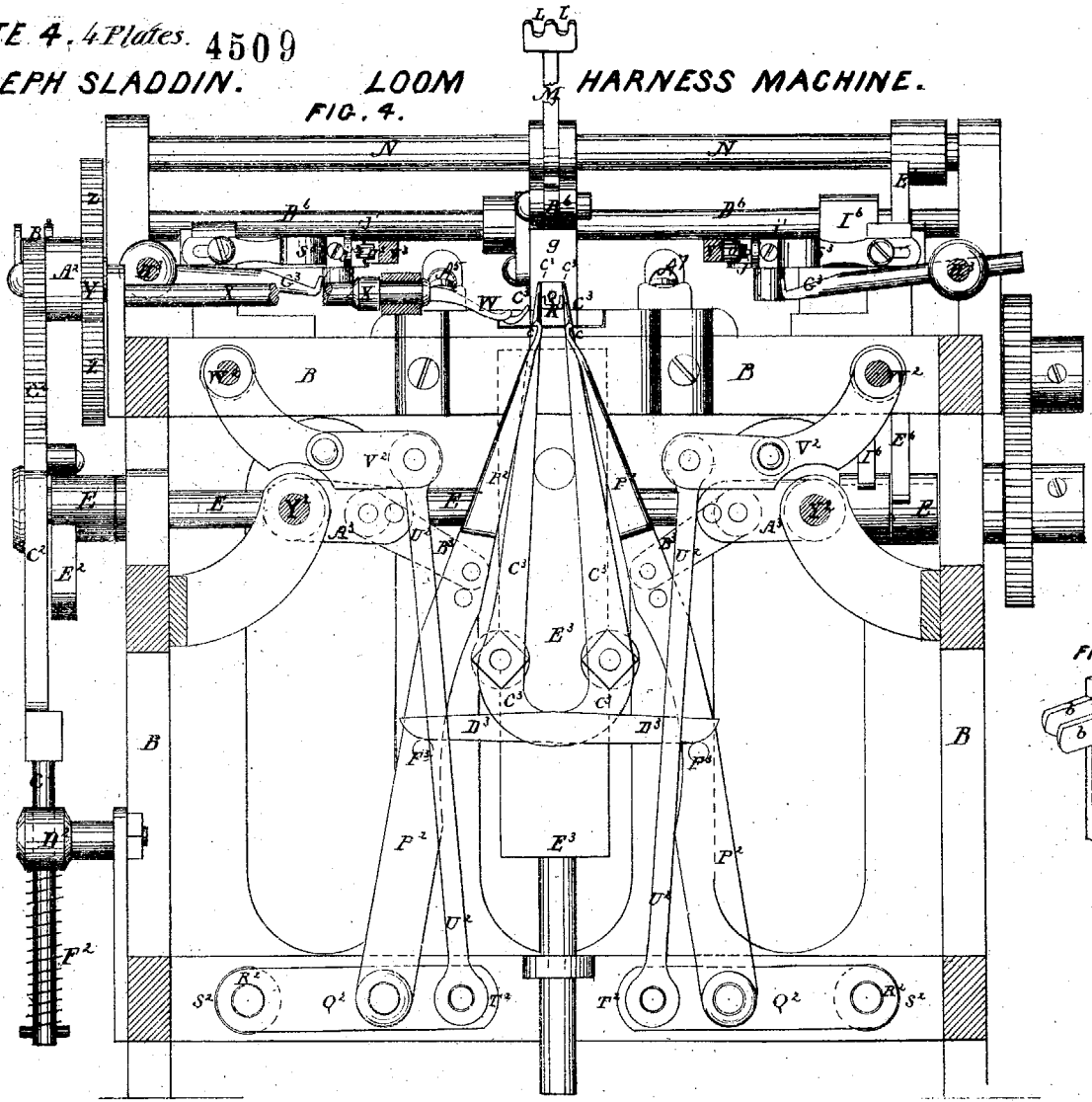
Figure 9:
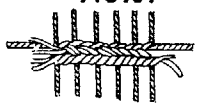
Figure 10:
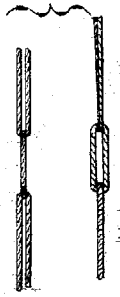
Figure 5:
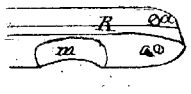
Figure 6:
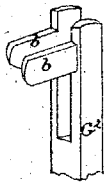

In the accompanying drawing my improvements in machines for making loom-harness are illustrated. Figure 1, in plate 1, is a plan view of a machine of the class to which they relate, showing them severally; Fig. 2, in plate 2, a side elevation; Fig. 3, in plate 3, a vertical longitudinal section of the machine in the plane of a line drawn between the points $x$ and $x$ of Fig. 1. Fig. 4, in plate 4, is a transverse vertical section in the plane of a line drawn between the points $y$ and $y$ of Fig. 1, deviating therefrom where such part of said line would strike the heddle-eye former, and passing there between said former and the end of stationary needle; Figs. 5, 6, 7, and 8, views, in detail, of same parts of the machinery; and Figs. 9 and 10, views, respectively, of a rig-band with the harness-yarns knit to it, and of a portion of the heddles.

A in the drawing represents a frame-work, made of any suitable construction to receive the working and stationary parts of the machine, it being shown in the present instance of a main frame, B, rectangular in shape, with a frame, C, extended from one end thereof. D, the driving-shaft, arranged transversely of the frame B, and to turn in standards on the upper side of frame-work.

Figure 7:
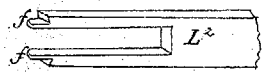
Figure 8:
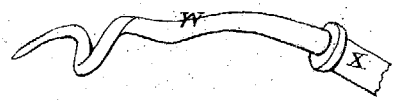

To this driving-shaft D power is to be communicated in any suitable manner by belt or gearing, and through it to the other moving parts of the machinery. By the revolution of shaft D are driven, through suitable intermediate gearing, with a continuous rotary movement, the primary shafts following, viz.: Shaft E, by which, with a disposition of mechanism to be hereinafter described, are moved the twister, the knitting-needles, and the forked lever for holding the heddle-eye in shape and the fingers between the tines of the yarn-carriers. Shaft F, by which, with a proper disposition of mechanism, to be hereinafter described, motion is communicated to the heddle-eye former, to the pushes of the heddle-eyes upon the needle, to the carriers of the heddle-yarns, to rig-bands, to the lapper-cylinder, and to fingers for receiving the yarns from their carriers and holding them while being knit to the rig-bands. At the end G of the upper portion of frame-work are located two bobbins, H, one each side of the central line of the machine, said bobbins H being suspended on horizontal spindles, and containing the yarns from which harness is to be made. These yarns are passed from the bobbins H down through rings I arranged to play freely on vertical guide-rods J, and from thence through fixed guide-eyes K to and through eyes L in upper end of angular arm M. This arm M is attached to a transverse horizontal shaft, N, and it carries the forked lever *g* for holding the heddle-eye deposited on stationary needle. From the arm M the yarns are continued toward the end O of frame-work A down around a grooved pulley, P, into and along the groove Q of a needle, R, to the end S of same, passing out therefrom, the one yarn through an eye, *a*, on one side of the needle, and the other yarn from a similar eye, *a*, directly opposite on the other side of needle, and thence to the rig-bands to which their ends are fastened, said rig-bands being extended along the length of the frame-work A from bobbins U to posts V, as will be hereinafter described. The needle R is made stationary, and is arranged along the length of the machine, extending from about the location of the guide-pulley P toward and below the shaft N of angular arm M and beyond said arm toward the end of the machine, where heddle-yarn bobbins H are located. W, the twister of the machine. This twister is located in the machine at one side of the stationary needle R, and is, at the end of shaft X, in nearly the same horizontal plane as the needle, but at right angles thereto, turning in suitable bearings of frame-work A. Y, a pinion-wheel, secured to twister-spindle X. With pinion Y a gear-wheel, Z, interlocks, carrying on its shaft $A^2$ a pinion-wheel, $B^2$, interlocking with a vertical toothed rack-bar, $C^2$. This rack-bar embraces the horizontal transverse shaft E, by which shaft and the arm $D^2$ of the frame-work B said rack-bar is guided in its movement up and down, produced in the one case by the revolution of the cam $E^2$ fixed to said primary shaft E, and in the other by the spiral spring $F^2$. This arrangement of mechanism, it is obvious, imparts a reciprocating rotary movement to the twister-shaft X. $G^2$, a vertical shaft arranged just beyond needle R, with its axis in same vertical plane as the center line of needle R. This shaft $G^2$ terminates below the plane of the needle R and turns in bearings of the frame-work B. Its upper end is fork-shaped, and each tine has a similar arm, *b*, the two being parallel, projecting horizontally. The arms *b* in their width and distance apart are equal to the full size of the heddle-eye to be made. This construction of shaft $G^2$, just above described, is particularly shown by Fig. 6, plate 4. The said shaft $G^2$ at its lower end has a crank-arm, $H^2$, connected through a stud with a slotted slide, $I^2$. This slide $I^2$ moves in suitable guides of the frame-work B, and by a cam, $J^2$, of primary shaft F and spiral spring $K^2$, it is operated from time to time, imparting a reciprocating rotary movement to the shaft. This shaft $G^2$, with its arms *b*, constitutes what was previously termed in this description the heddle-eye former, and for convenience will be hereinafter so denominated. T, extension to slide $I^2$, through which it bears on cam $J^2$, to be operated as described. $L^2$, a fork-shaped bar, shown in detail in Fig. 7, plate 4. This bar is arranged in a corresponding plane to the needle just beyond the heddle-eye former $G^2$, so that when operated it will pass between the upright arms of heddle-eye former. The extreme end *f* of tines to bar $L^2$ are made as shown in Fig. 7. For moving bar $L^2$ to and fro between the arms of the heddle-eye former (it being suitably guided) the upper end of a vertical lever, $M^2$, is hung to it, which, extending below, is confined to the periphery of a cam, $N^2$, on primary shaft F, made of suitable shape to move the said bar $L^2$ forward, and to allow it, by the action of a spiral spring, $O^2$, to be drawn back to its original place. This slide-bar $L^2$ is the pusher, heretofore so called in this description. $P^2$ $P^2$, fork-shaped levers, two in number, and constructed with a hook, *c*, at the end of their tines. These levers $P^2$ are located one upon each side of the needle, and at their lower ends are hung to levers $Q^2$, pivoted by their end $R^2$ to the frame-work at $S^2$, and by their end $T^2$ are connected with the lower end of vertical pitmen-rods $U^2$, that at their upper ends are pivoted to levers $V^2$, in turn pivoted to the frame-work at $W^2$. The levers $V^2$ carry friction-bowls bearing on cams $X^2$ of the shaft $Y^2$, and actuating the levers $V^2$. This shaft $Y^2$ receives motion from the primary shaft F, to which in each case it is connected by bevel-gear wheels $Z^2$. The shafts, $Y^2$, in addition to their connection with the fork-levers $P^2$, above described, are also connected thereto through crank-arms $A^3$ and short pitmen-rods $B^3$. The said vertical levers $P^2$ are what in the nature of this invention were called carriers, for carrying the heddle-yarns to the rig-bands, and hereafter will be so designated for convenience of reference. $C^3$ represents two fingers, arranged one on each side of the stationary needle R, between the tines of yarn-carriers $P^2$ below the stationary needle R, terminating at their lower end with horizontal arms $D^3$, projecting the one toward and beyond the other, and at such ends hung to a vertical piece, $E^3$. This piece $E^3$ is arranged to slide up and down in the frame-work of the machine, and to be actuated by a cam, $M^6$, on shaft E. $F^3$, studs of the yarn-carriers $P^2$, to act on the fingers $C^3$ to open them from the needle, as will be hereafter described. $G^3$, arms, two in number, one at each rig-band, and outside thereof. These arms $G^3$ are located transversely of the machine, and directly opposite each other. Their inner ends are hook-shaped, and by the outer ends of each they are fastened to short horizontal longitudinal shafts $H^3$, having arms $I^3$ arranged to bear upon the cam-edges $J^3$ of the cylinders $K^3$, said cylinders turning within upright brackets $L^3$ at the top of frame-work. These cylinders are driven as will be hereinafter described. The arms $G^3$ are for the purpose of receiving the yarns from the yarn-carriers $P^2$, and holding them while the knitting-needles are operating, as will be presently described. For convenience of description they will be designated as the heddle-yarn holders. $M^3$ are barbed knitting-needles of the ordinary construction, one at and along the outside of each rig-band. These needles $M^3$ are secured to a common horizontal cross-head, $N^3$, suitably guided. $O^3$ and $P^3$, arms on rock-shaft $A^6$. The arm $O^3$ is connected to the cross-head $N^3$, and the arm $P^3$ bears on a cam, $Q^3$, of the primary shaft E, causing a movement of the cross-head $N^3$ in the one direction, and a spring, $R^3$, a movement in the opposite direction. The knitting-needles $M^3$ move through guide and supporting-eyes of fixed horizontal arms $S^3$. Against the outer end of these guide-arms $S^3$ presser-rollers $U^3$ of arms $V^3$ bear, confining the rig-bands thereto. The arms $V^3$ are secured to brackets $L^6$ by adjustable connections. The end $J^1$ of needle-support and guides $S^3$ acts to knock off the stitches from the needles, and spring-arms $J^2$ $J^2$ to press the needle-barbs down in the grooves of the needles, when it is required to slip the loop off said needles.

The cylinders $K^3$, hereinbefore referred to, are hollow from end to end, and the rig-bands, from their bobbins, are passed through them to the pins V. Said cylinders are arranged to rotate through gear-wheels $W^3$ $X^3$ $X^6$, connecting them with shaft $Y^2$ geared with the primary shaft F, as hereinbefore described. The cylinders each carry a bobbin, $Y^3$, having yarn wound upon it. These yarns are conducted through the cylinders $K^3$ to and through a guide-eye, $Z^3$, fixed to the cylinders $K^3$, thence to the rig-bands, to which they are fastened at the same point as the heddle-yarns. The posts V for the two rig-bands are on a common cross-head or carriage, $A^4$, arranged to move upon fixed parallel horizontal guide-rods $B^4$.

To this carriage $A^4$ motion is communicated through a horizontal screw-shaft, $C^4$, shown by dotted lines in Fig. 1 of the drawing, driven by bevel-gears $D^4$, and said gears through a horizontal transverse shaft, $E^4$, driven in its turn from the driving-shaft D through the series of gear-wheels $F^4$, arranged along and upon one side of the machine.

The fork-lever and retainer *g* for heddle-eye, as before stated, is carried by the angular arm M, to which, at its end $B^6$, it is jointed. This fork-lever *g* is also connected to one end of a link, $C^6$, hung loosely by its other end upon a transverse horizontal shaft, $D^6$, below the shaft N, the shaft $D^6$ being arranged to turn in suitable bearings of the frame-work. To the shaft N is secured a lever, $E^6$, projecting downward into position to be acted upon by a cam, $F^6$, of the primary shaft E. By this cam $F^6$ the shaft N is moved in one direction, while, by a spiral spring, $G^6$, connected to the lever $E^6$, it is moved in opposite directions. The movement of fork-lever *g*, by operation of the cam, is upward and out of position about the heddle-eye or needle R, and by the spiral spring $G^6$ downward and into position. By the link $C^6$ the movement of forked lever *g* in and out of position, with respect to the heddle-eye on needle R, is more direct and straight, obviating all possibility of abrasion of the heddle-yarns. The forked lever *g*, in addition to holding the heddle-eye, at the same time also holds the needle R from lateral play, releasing the needle, however, when it rises, so as to allow the harness, as made, to pass along the length of same.

In addition to the hold on the needle R by the forked lever *g*, as above described, a presser-foot, $H^6$, is arranged also for the same purpose. This presser-foot $H^6$ is formed so as to embrace the sides of the needle R, and is fastened to the shaft $D^6$, hereinbefore referred to. This shaft $D^6$ is provided with a fixed lever-arm, $I^6$, extended to bear upon a cam, $J^6$, of the primary shaft E. By this cam $J^6$ said presser-foot is operated in the one direction, and by a spiral spring, $K^6$, connected with lever $I^6$, in the other direction. The plane of action of the presser-foot $H^6$ is just back of that of the heddle-eye holder *g*, and it holds the needle R from lateral play when the said fork-lever *g* is released. The two, however, it is obvious, are to operate, the one after the other, in such manner as not to interfere with the progress of the harness through the machine by the feed of the carriage $A^4$.

With the carriage $A^4$ moved to a position near the main frame B, the rig-band cords drawn off their bobbins U under guide-pulleys $G^4$, and thence to posts V, as described, (weights $H^4$ being suspended to keep the rig-bands at a tension,) the heddle-yarns drawn and extended to the rig-bands and there fastened, as previously set forth, the yarn from lapper-bobbins properly drawn and fastened to the rig-bands, the operation of the within-described machine, power being applied to the driving-shaft D, is as follows: The yarn from one eye of the needle is seized by the twister W on such side, carrying it downward completely around the horizontal projecting arms *b* of heddle-eye former $G^2$, said former having been previously turned to bring said arms to point in the proper direction therefor. The heddle-eye former is then turned back, bringing its arms *b* in line with the stationary needle R, the twister turning back to allow the yarn to pass off of it, where, the former remaining stationary, the heddle-yarn wound around its arms *b* is then pushed by the pusher $L^2$ from said arms onto the needle R, and along its length beyond its eyes, drawing, as a consequence, the yarns leading from such eyes along with it. The fork-lever *g* is now moved down, bringing its tines outside of but against the looped yarn or heddle-eye about the needle, holding it there, while on each side of the needle R the yarns stretching from ends of looped yarn to needle-eyes are taken by the vertical fingers $C^3$, pulled out from the needle toward the rig-band, and deposited on the hook ends of the carriers $P^2$, by which the two yarns are then carried to and beyond the rig-bands and deposited upon the yarn-holders $G^3$, there arranged for the knitting-needles to take hold of them. With the heddle-yarns thus held, and the yarn from each of the lapper-cylinders, through their continuous rotary movement, lapped or wound around the barbed needles and the rig-band cords, the heddle-yarns are taken by the needles in their forward movement, the yarn-holders then dropping away from the yarn, when the needles move backward and close against the pressers in the usual manner of knitting, completing thus the last of the several stages of the operations of the machine. The movements thus described take place for each and every heddle-eye made in the machine, and during the same the carriage or cross-head $A^4$ is slowly carried or fed forward, so as to take the heddle-eye as formed sufficiently forward for another heddle-eye to be made.

In the operation of the several devices which act directly upon the harness-yarns, as above described, the gearing or other means employed between a continuous moving driving-shaft must be arranged and constructed to impart the motions necessary and at the proper time or times.

The particular movement of the several parts is as follows: The twister is reciprocating rotary, moving sufficiently around in the one direction to secure the disposition of the heddle-yarn seized by it upon the heddle-eye former, and then back to allow the yarn to pass off of it and to again take a heddle-yarn and twist it around the former for the next heddle-eye. The former $G^2$ is reciprocating rotary, but only through a portion of a circle—a quarter being sufficient—its plane of rotation and that of the twister being at right angles to each other, and the needle R being disposed as described. The heddle-eye retainer or lever *g* is intermittent rocking, moving down into and up out of the position stated, its movement downward occurring just after the deposit of heddle-eye on stationary needle R by pusher $L^2$, and its movement upward releasing the heddle-eye just after the stitching of the heddle-yarns to the rig-bands is completed. The heddle-eye pusher is rectilinear intermittent. The vertical finger $C^3$ and heddle-yarn carriers $P^2$ have each both an upward movement and a movement toward the rig-bands. The movement of the fingers $C^3$ toward the rig-bands is only for a portion of the distance, while that of the yarn-carriers $P^2$ is for the entire distance and beyond the rig-bands, and they operate together as follows: The fingers first move, being acted upon through their common holder $E^3$ by cam $M^6$ to shaft E, and are raised, passing through the concaves *m* of needle R, between needle and heddle-yarns stretched along it. In Fig. 4, plate 4, they are shown in their highest position; and then the yarn-carriers $P^2$, they each moving both upward and toward and beyond the rig-bands, cause at the same time a partial outward movement of the fingers $C^3$ from the needle. The upward and outward movements of the yarn-carriers are produced by the cam $X^2$ and crank-arm $B^3$ of shafts $Y^2$ operating conjointly through the arrangement of parts, hereinbefore described, as disposed between said cam $X^2$ and crank $B^3$. The outward movement of the fingers $C^3$ is produced by the impingement of the studs $F^3$ of yarn-carriers against the angular arms $D^3$ of such fingers, swinging necessarily such fingers outward, the yarn-carriers on one side of the needle swinging out the finger on the other or opposite side. By the continued movement toward the rig-bands of the yarn-carriers their studs $F^3$ escape or pass by the ends of finger-arms $D^3$, allowing the fingers to be thrown back to their position against the needle by the action of bent springs *n* properly applied therefor, while, at the same time, from their weight and that of their common carrier or slide $E^3$, they drop into position to be again raised. Before the fingers have reached the limit of their outward movement the hook ends of yarn-carriers have reached a position, both as to height and distance from needle, to take on their hooks the yarns drawn out from needle by the fingers and before such fingers fly back to the needle. The yarn-carriers continue to carry the yarns to the rig-bands, as before described, depositing them on the yarn-holders $G^3$ there arranged, the yarn-carriers having a downward movement for so depositing their yarns on the holders.

The movement of the yarn-holders is vertical rocking, and their upward movement occurs in time to take the yarn from the yarn-carriers, drawing them up partially around the outside of rig-bands and knitting-needles, where, remaining stationary, the knitting-needles then are moved toward the delivery end O of the machine, seizing the yarns looped on said yarn-holders, which then lower, releasing the heddle-yarns for the knitting mechanism to complete the fastening to the rig-bands.

The movement of the forked lever *g* for holding heddle-eye in shape on stationary needle while the yarn-carriers are conveying the heddle-yarn to the rig-bands is vertical rocking.

The concavities *m* of the needle R allow the fingers $C^3$, when raised as described, to pass more freely between the heddle-yarns and needle. By the groove of the needle R the heddle-yarns passing to the heddle-eye are removed from rubbing against the heddle-eyes, being fed along the needle to the delivery end of the machine.

$A^5$ $A^7$, rods secured to the extension C of main frame B of frame-work, and running therefrom to the weaving plane or nearly so of the mechanism by and through which loom-harness, as herein described, is made, and their office is to produce the leese, so called, in the harness. The rods $A^5A^7$ near their inner ends each rest upon the upper end of vertical rods $B^5$, arranged to slide within suitable guide of the frame-work and to be operated by and through cams $C^5$ on the primary shaft E. By the rods $A^5$ $A^7$, as harness is made in the machine, the leese thereof is produced, this leese consisting in a certain disposition of the yarn from each side of the needle R upon the rods $A^5$ $A^7$, as such successive heddle-eye is made for the purpose of holding the harness open to allow the harness-shafts, so known in loom mechanism, to be passed freely through from end to end of the harness, saving the labor of picking the harness. The operation of the rods is, with the mechanism described, vertical reciprocating. This movement of the rods takes place in connection with the operation of the other parts of the machine, to which this invention relates, as and at the time and in the manner below described. The yarn from one side of the needle having been taken and made into an eye, the eye thus made placed on the needle beyond the free ends $D^5$ of leese-rods $A^5$ $A^7$, and the needle-yarns seized to be carried to rig-bands, (the travel of the carriers being at right angles to the length of the leese-rods,) the carriers being in their continued movement to rig-bands, the yarn-lengths from heddle-eye to the carriers across the rods, the yarn-lengths from carrier to needle-eyes, which it is obvious are continuous with those from heddle-eye, are placed across the plane of leese-rods by the deposit of next heddle-eye on needle R. The harness-yarns thus being deposited across the rods $A^5$ $A^7$, it is obvious that, were they fixed, each successive heddle-yarn deposited by the pusher and by the yarn-carriers across their plane would necessarily be on the same side thereof—that is, suppose the rods are down below the horizontal plane of heddle-yarns, then each successive yarn would be laid upon the upper side of the leese-rods; but were the rods above the horizontal plane of the heddle-yarns, then each successive yarn would be under the rods. In order, however, to produce by the rods $A^5$ $A^7$ what is known as leese in the harness, they are arranged in the present machine to operate as follows: The two yarn-lengths from the heddle-eyes, as successively made, are the two from the first eye laid above such rod, the two from the second eye below, and the two from the third above, and so on, these rods $A^5$ $A^7$, through their cams $C^5$, being raised and allowed to lower at the proper times their upward or downward movement, as the case may be, occurring for each travel of the yarn-carrier on each side of the heddle R to rig-bands.

Having thus described my invention, I shall state my claims, as follows:

1. The stationary needle R, constructed with a groove, Q, along its upper face, and with two eyes, *a*, leading outward from said groove, one on each side, substantially as described, for the purpose specified.

2. The twister W, for seizing one of the yarns employed and carrying it around and depositing it on a holder or former in the form of a heddle-eye, substantially as described, for the purpose specified.

3. The pusher $L^2$, constructed, arranged, and operating in connection with the heddle-eye former, substantially as and for the purpose described.

4. The combination of the needle R, twister W, former $G^2$, and pusher $L^2$, arranged with regard to each other, and operating substantially as described and for the purpose set forth.

5. The carriers $P^2$ and fingers $C^3$, combined, arranged, connected, and operating together as described, for the purpose described.

6. The fork-shaped lever *g*, provided with a link connection, $e^6$, arranged to act on the lever *g*, substantially as and for the purpose described.

7. The presser $H^6$, for holding the needle R, in combination with the fork-shaped lever *g*, substantially as described.

8. The rods $A^5$ $A^7$, combined and arranged to rise and fall, substantially as described, for the purpose specified.

The above specification of my improvements in machines for making loom-harness signed by me this 8th day of March, 1871.

JOSEPH SLADDIN.

Witnesses:
JOHN LORD,
ALBERT W. BROWN.